Patented May 18, 1926.

1,585,096

UNITED STATES PATENT OFFICE.

CLARENCE J. HERRLY, OF NIAGARA FALLS, NEW YORK, ASSIGNOR TO CARBIDE AND CARBON CHEMICALS CORPORATION, A CORPORATION OF NEW YORK.

PROCESS OF MAKING CROTONALDEHYDE.

No Drawing. Application filed May 22, 1924. Serial No. 715,235.

This invention relates to improvements in the manufacture of crotonaldehyde from aldol ($\beta$-hydroxy butyraldehyde) or materials containing it. A standard method for preparing crotonaldehyde comprises in general the condensation of acetaldehyde to aldol and the decomposition of the latter into crotonaldehyde and water, as represented by the following equation:

Crotonaldehyde as heretofore produced for commercial purposes ordinarily contains substantial amounts of impurities. These may include acetaldehyde, crotonic acid, acetic acid, acetals, oily or resinous substances, and others, depending upon the nature of the process. They are often difficult to remove and may prove troublesome in the treatment of the crotonaldehyde. I have discovered for example that traces of acetaldehyde are highly detrimental in the hydrogenation of crotonaldehyde to butyraldehyde and butyl alcohol. The acetaldehyde forms difficultly removable impurities and lowers the yield of the desired hydrogenation products.

In accordance with the present invention the formation of detrimental substances is substantially prevented during the conversion of aldol to crotonaldehyde by excluding air from the reagents and reaction mixture and by quickly removing the decompositior products with a current of steam or inert gas. The crotonaldehyde is fractionated in an inert atmosphere to remove traces of acetaldehyde which may have been introduced with the aldol.

The following example is illustrative of the invention: Aldol is heated under slightly reduced pressure with exclusion of air to a temperature not in substantial excess of 165° C. The aldol is preferably prepared according to the process described and claimed in my application Serial No. 715,236 filed of even date herewith. It may be substantially pure, or may contain uncondensed acetaldehyde and precipitated salts.

The aldol should be made and stored in an atmosphere of nitrogen, acetylene, or other non-oxidizing gas, and should be transferred to the reaction vessel with little or no exposure to air. An atmosphere of nitrogen or equivalent gas is maintained in the reaction vessel throughout the process. This may be done in any suitable way. A rapid current of nitrogen, steam, or the like, passed through the reaction mixture to carry off the crotonaldehyde, is sufficient to maintain an inert atmosphere. I prefer to use live steam for this purpose, and the term "gaseous substance" as used in the appended claims is to be understood as including steam.

Both aldol and crotonaldehyde are highly reactive bodies and there is a pronounced tendency to form condensation products, acetals, and other substances in the reaction mixture. The rapid removal of the crotonaldehyde in accordance with the present invention substantially prevents the formation of such condensation products or compounds.

The effluent may be condensed and collected in any suitable way. Provision should be made in all cases to prevent undue contact with the air.

The process may be made continuous by feeding a small steady stream of aldol into the reaction vessel. The aldol is decomposed by contact with the heated atmosphere or walls of the vessel. By proceeding in this way no considerable volume of aldol is subjected to prolonged heating. I have discovered that such heating, which is a necessary incident of the batch process, may under certain conditions lead to the formation of undesirable compounds. The continuous process has a further important advantage in facilitating the manufacture of crotonaldehyde on a large scale.

Traces of acetaldehyde are usually the principal impurity in crotonaldehyde prepared according to the present invention. These are removed by fractionating the crotonaldehyde in an inert atmosphere. The resulting product is substantially pure. The presence of acetaldehyde might be avoided by a careful purification of the aldol used as the source of crotonaldehyde. I have found, however, that it is more convenient to remove the acetaldehyde from the final reaction product in the manner stated.

High yields are obtained both by the batch and continuous processes described herein. The crotonaldehyde has been found to be especially suited for hydrogenation. When using it instead of crotonaldehyde made by prior methods, improved yields of high purity butyraldehyde and butyl alcohol may be secured.

I claim:

1. Process of making crotonaldehyde, comprising subjecting a material containing aldol to a decomposition temperature with substantially complete exclusion of air, and removing the decomposition products as formed, whereby the formation of undesired compounds is minimized.

2. Process of making crotonaldehyde, comprising subjecting a material containing aldol to a decomposition temperature in an inert atmosphere, and removing the decomposition products by a stream of an inert gaseous substance.

3. Process of making crotonaldehyde, comprising subjecting aldol to a decomposition temperature not in excess of about 165° C. and in an inert atmosphere, and removing the decomposition products by a current of steam.

4. Process of making crotonaldehyde, comprising passing into a heated reaction vessel, containing aldol, a stream of an inert gaseous substance adapted to exclude air and to remove decomposition products.

5. Process of making crotonaldehyde, comprising subjecting aldol to a decomposition temperature in an inert atmosphere, maintaining a sub-atmospheric pressure on the reaction mixture, and drawing off the decomposition products as formed.

6. Process of preparing substantially pure crotonaldehyde, comprising subjecting aldol to a decomposition temperature in an inert atmosphere, removing the decomposition products, and fractionating the same with exclusion of air to isolate the crotonaldehyde.

7. Process of preparing substantially pure crotonaldehyde, comprising preparing aldol with exclusion of air, transferring the aldol to a reaction vessel in which an inert atmosphere is maintained, subjecting the aldol in such vessel to a decomposition temperature, removing the decomposition products, and fractionating the same in an inert atmosphere to isolate the crotonaldehyde.

8. Process of decomposing aldol, comprising feeding aldol substantially continuously into a heated zone, and removing the decomposition products therefrom.

9. Process of decomposing aldol for the production of crotonaldehyde, comprising feeding aldol substantially continuously into a hot reaction vessel in which an inert atmosphere is maintained, and removing the decomposition products from the vessel.

10. Process of making substantially pure crotonaldehyde, comprising decomposing aldol to form crotonaldehyde, and fractionating the crotonaldehyde in an inert atmosphere to remove impurities.

In testimony whereof, I affix my signature.

CLARENCE J. HERRLY.